United States Patent
Courtright et al.

(10) Patent No.: US 9,180,745 B1
(45) Date of Patent: Nov. 10, 2015

(54) PICKUP TRUCK WITH PROVISIONS FOR GOOSENECK HITCH

(71) Applicant: FORD GLOBAL TECHNOLOGIES, LLC, Dearborn, MI (US)

(72) Inventors: Mark Joseph Courtright, Allen Park, MI (US); John Comiez, Novi, MI (US); David Michael Reamer, Jackson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/315,522

(22) Filed: Jun. 26, 2014

(51) Int. Cl.
*B62D 25/20* (2006.01)
*B60D 1/48* (2006.01)
*B60D 1/06* (2006.01)
*B62D 29/00* (2006.01)

(52) U.S. Cl.
CPC *B60D 1/485* (2013.01); *B60D 1/06* (2013.01); *B62D 29/008* (2013.01)

(58) Field of Classification Search
CPC .............. B60J 7/102; B60P 3/40; B60P 7/04; A41C 19/005; B60D 1/06; B60R 9/06; B60R 3/02; Y10S 280/901
USPC ............... 296/184.1, 3, 37.6, 26.08; 224/402, 224/403, 404, 405, 519; 414/462; 280/417.1, 423.1, 433, 438.1, 441.2, 280/491.5, 511, 901
See application file for complete search history.

(56) References Cited

U.S. PATENT DOCUMENTS

| | | | | |
|---|---|---|---|---|
| 2,925,286 A * | 2/1960 | Hodges, Jr. et al. | .......... | 280/434 |
| 3,827,722 A * | 8/1974 | Miller et al. | .................. | 280/432 |
| 4,620,330 A * | 11/1986 | Izzi, Sr. | ............................ | 4/288 |
| 4,921,266 A * | 5/1990 | Beals | ......................... | 280/415.1 |
| 5,080,418 A * | 1/1992 | Semple et al. | ................ | 296/39.2 |
| 5,435,585 A * | 7/1995 | Chambers | .................. | 280/415.1 |
| 6,158,761 A * | 12/2000 | King | ............................. | 280/495 |
| 6,189,573 B1 * | 2/2001 | Ziehm | ............................. | 138/89 |
| 6,447,000 B1 * | 9/2002 | Dick et al. | ..................... | 280/511 |
| 6,533,308 B1 * | 3/2003 | Tambornino | ............... | 280/491.1 |
| 6,776,431 B1 * | 8/2004 | Dick | ........................... | 280/425.2 |
| 6,935,650 B2 | 8/2005 | Grinde et al. | | |
| 6,969,090 B1 * | 11/2005 | Works | ........................... | 280/407 |
| 7,775,545 B2 * | 8/2010 | Dick | ........................... | 280/491.1 |
| 7,793,968 B1 * | 9/2010 | Withers | ........................ | 280/496 |
| 8,414,009 B2 * | 4/2013 | Stanifer et al. | ............... | 280/433 |
| 8,550,485 B2 * | 10/2013 | Leech et al. | ............... | 280/416.1 |
| 8,814,254 B1 * | 8/2014 | Peffley et al. | ............. | 296/183.1 |
| 8,827,298 B2 * | 9/2014 | Diller | ........................... | 280/433 |
| 8,840,128 B2 * | 9/2014 | Glazner | ........................ | 280/422 |
| 8,960,705 B2 * | 2/2015 | McCall | ..................... | 280/438.1 |

(Continued)

OTHER PUBLICATIONS

Installation Instructions, 30035 Base Rail Mounting Kit, 10 Bolt Rail Kit, Cequent Performance Products, Inc., 2013.

*Primary Examiner* — Kiran B Patel
(74) *Attorney, Agent, or Firm* — Jason Rogers; Brooks Kushman P.C.

(57) ABSTRACT

A pickup is adapted to facilitate installation of a gooseneck hitch by installation of a hitch frame between the frame rails under the pickup bed box and provision of a hole in the pickup bed floor over the hitch frame. The bead pattern is designed to add rigidity in the vicinity of the hole. The beads on the left and the right of the hole are not interrupted in the vicinity of the hole. Instead, they are narrowed such that the separation between the beads is greater than the hole diameter in the vicinity of the hole while it is less than the diameter of the hole in other locations.

8 Claims, 7 Drawing Sheets

(56) References Cited

U.S. PATENT DOCUMENTS

| | | | |
|---|---|---|---|
| 2003/0015855 A1* | 1/2003 | McCoy et al. | 280/433 |
| 2003/0034633 A1* | 2/2003 | Belinky | 280/507 |
| 2003/0047906 A1* | 3/2003 | Hicks et al. | 280/433 |
| 2003/0067139 A1* | 4/2003 | Hosmer | 280/433 |
| 2004/0113390 A1 | 6/2004 | Broussard, III | |
| 2006/0108770 A1* | 5/2006 | Burns et al. | 280/433 |
| 2007/0046056 A1* | 3/2007 | Delaney et al. | 296/37.6 |
| 2008/0042469 A1* | 2/2008 | McNulty et al. | 296/183.1 |
| 2011/0115195 A1 | 5/2011 | Erickson et al. | |
| 2014/0084567 A1* | 3/2014 | Schwennsen et al. | 280/495 |
| 2015/0028565 A1* | 1/2015 | Bowe | 280/491.5 |

\* cited by examiner

PICKUP TRUCK WITH PROVISIONS FOR GOOSENECK HITCH

TECHNICAL FIELD

This disclosure relates to the field of pickup truck structures. More particularly, the disclosure pertains to adaptations to facilitate installation of a gooseneck hitch.

BACKGROUND

Pickup trucks are motor vehicles with a rear open top cargo area often referred to as a bed. Pickup trucks are popular largely because the bed allows them to be utilized in so many different ways, including carrying a variety of types of cargo and towing various types of trailers. Traditionally the majority of body structures on pickup trucks have been formed from steel alloys. Through years of experience, pickup truck designers have learned how to design steel truck body parts that withstand the variety of demanding pickup truck applications. The current regulatory and economic environment have increased the importance of making pickup trucks more fuel efficient as well as functional and durable. One way to reduce the fuel consumption of a vehicle, especially when unloaded, is to reduce vehicle structure weight.

Aluminum alloys typically have a higher strength to weight ratio than steel alloys. Consequently, replacing steel with aluminum offers the potential for weight reduction. However, the elastic modulus of aluminum is generally lower than the elastic modulus of steel. As well, fabrication techniques and methods of joining parts that work well for steel parts may not work well for the same aluminum part. Due to these and other differences, simple material substitution does not necessarily produce an acceptable design.

Oil canning is a phenomenon that may occur when light-gauge metal is used in flat structures. Internal stresses in the metal may cause the material to bulge inwardly or outwardly in localized areas and to oscillate back and forth. These bulges may be visible, especially under certain lighting conditions. An oscillation from an inward bulge to an outward bulge, or vice versa, may produce a popping sound. Oil canning may be more prevalent in aluminum structures than steel structures of the similar shapes and sizes. Although oil canning does not significantly alter objective measures of structural integrity, it may be perceived by consumers as an indication of lower quality.

Aluminum alloys are generally identified by a four-digit number, the first digit of which typically identifies the major alloying element. When describing a series of aluminum alloys based on the major alloying element, the first number may be followed by three x's (upper or lower case) or three zeros. For example, the major alloying element in 6xxx (or 6000) series aluminium alloy is magnesium and silicon, while the major alloying element of 5xxx series is magnesium and for 7xxx series is zinc. Additional numbers represented by the letter 'x' (or zeros) in the series designation define the exact aluminum alloy. For example, a 6061 aluminum alloy has a composition of 0.4-0.8% Silicon, 0-0.7% Iron, 0.15-0.4% Copper, 0-0.15% Manganese, 0.8-1.2% Magnesium, 0.04-0.35% Chromium, 0-0.25% Zinc, and 0-0.15% Titanium. Different alloys provide different trade-offs of strength, hardness, workability, and other properties.

In addition, five basic temper designations may be used for aluminum alloys which are: F—as fabricated, O—annealed, H—strain hardened, T—thermally treated, and W—as quenched (between solution heat treatment and artificial or natural aging). The temper designation may be followed by a single or double digit number for further delineation. For example, aluminum with a T6 temper designation has been solution heat treated and artificially aged, but not cold worked after the solution heat treatment.

SUMMARY OF THE DISCLOSURE

A truck includes two frame rails, a hitch frame extending between the frame rails, and a pickup bed. The pickup bed includes a sheet metal bed floor and front and rear cross supports welded to the sheet metal bed floor. The sheet metal floor may be fabricated from an aluminum alloy such as a 6xxx series alloy. The sheet metal bed floor defines a hole over the hitch frame to permit installation of a gooseneck hitch into the hitch frame through the bed floor. The hole is between the front and rear cross supports. A center cross support, also having a hole, may be welded to the sheet metal floor under the hole. The sheet metal bed floor includes a number of raised beads including a left bead and right bead that run without interruption between the cross supports on opposite sides of the hole. The beads are separated from one another by less than the diameter of the hole where they cross the cross supports. The beads are narrowed near the hole such that the separation is wider than the diameter of the hole. A cover may be inserted into the hole when the gooseneck hitch is not installed.

DETAILED DESCRIPTION

Embodiments of the present disclosure are examples and other embodiments may take various and alternative forms. The figures are not necessarily to scale and some features may be exaggerated or minimized to show details of particular components. The specific structural and functional details disclosed are not to be interpreted as limiting, but merely as a representative basis for teaching one skilled in the art how to utilize the present invention. Various features illustrated and described with reference to any one of the figures can be combined with features illustrated in one or more other figures to produce embodiments that are not explicitly illustrated or described. Combinations and modifications of features consistent with the teachings of this disclosure could be used for particular applications or implementations.

Figure 1:
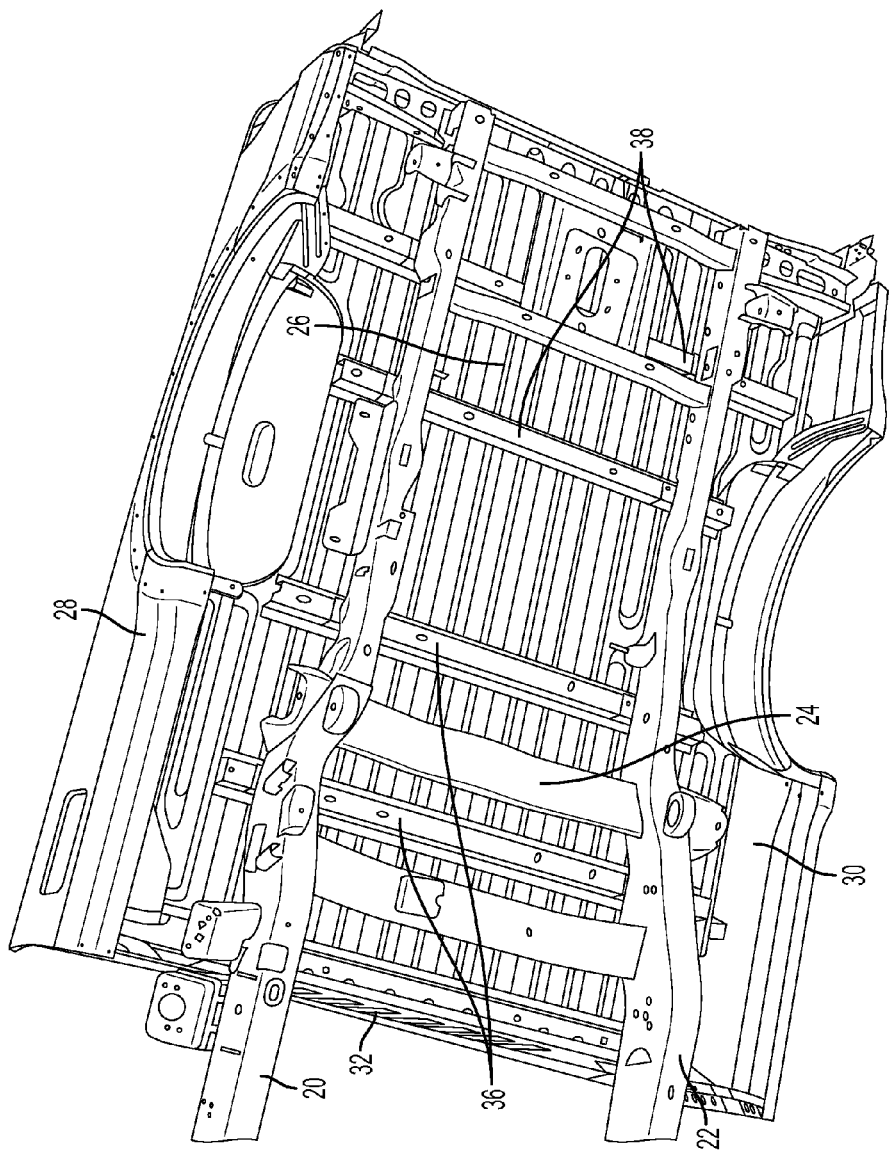
FIG. 1 is a bottom perspective view of a pickup bed and frame rails.

A pickup truck is built around a frame structure to which other components are attached. The rear portion of a pickup frame, as viewed from underneath, is shown in FIG. 1. Left and right frame rails 20 and 22 run longitudinally. A number of frame cross members 14 are rigidly fastened to each frame rail. A bed is attached to the frame to accommodate a wide variety of different types of cargo. The bed includes a floor 26, a left side wall 28, a right side wall 30, a front sill 32, and a hinged rear tailgate 34 (not visible in FIG. 1). The floor is formed from stamped sheet metal. When a vertical load is exerted between the support points, the floor 26 is subject to longitudinal and transverse bending loads. Stiffness with respect to a bending load is proportional to the cube of the effective thickness. To add stiffness with respect to transverse bending loads, one or more front cross members 36 and rear cross members 38 are welded to the underside of sheet metal floor 26. To reduce weight, the bed may be fabricated from an aluminum alloy, such as 6111.

Figure 2:
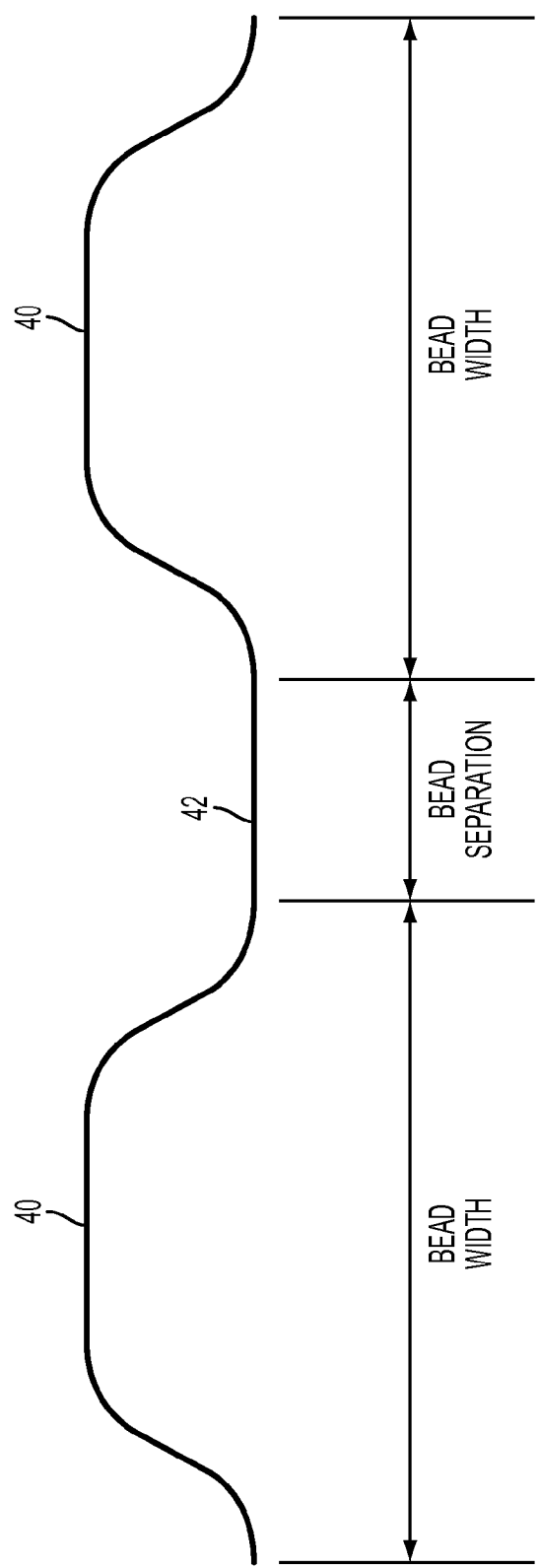
FIG. 2 is a diagrammatic partial cross section of the floorpan of the pickup bed of FIG. 1.

A number of raised beads are stamped into the sheet metal bed floor running in a generally longitudinal direction from near the front sill 32 to near the rear tailgate 36. FIG. 2 shows a cross section through two adjacent beads of the sheet metal floor. This cross section would be typical in most areas of the floor such as the region where the beads intersect a cross member. Each bead has a bead width which is not necessarily identical with other beads and may vary at different cross sectional locations. Adjacent beads are spaced apart from one another by a bead separation distance which may differ among pairs of adjacent beads and at different cross sectional stations. Beads increase the effective thickness and the stiffness of the floor with respect to longitudinal bending loads. A downward force on the pickup bed places the raised portions 40 in compression and the non-raised portions 42 in tension.

When a pickup truck is used to tow a trailer, an attachment mechanism must be provided to transmit loads from the trailer to the frame rails 20 and 22. These loads include longitudinal forces for pulling the trailer as well as a vertical loads for supporting a portion of the weight of the trailer. The mechanism must accommodate some pivoting as the vehicle turns a corner or when the road surface under the trailer is oriented differently than the road surface under the truck. For relatively small trailers, a hitch receiver may be attached directly to the frame rails 20 and 22. A hitch, including a ball, may then be inserted into the receiver such that it extends from under the rear of the truck. A socket on the trailer fits over the ball to join the trailer to the hitch while allowing a sufficient amount of relative rotational motion. This type of hitch receiver is not appropriate for heavy trailers, however, because the trailer weight is supported far behind the truck axles. For heavier trailers, gooseneck or fifth wheel hitches are preferred. A gooseneck hitch includes a ball sticking upward through the truck bed floor 26. With a fifth wheel hitch, the weight of the trailer is supported on a horizontal plate while the longitudinal forces are conveyed through a kingpin. Designing the truck bed to transfer these loads to the frame rails 20 and 22 may result in an excessively heavy bed structure. With either a gooseneck hitch or a fifth wheel hitch, other structure is provided to transfer the loads to the truck frame without applying excessive loads to the bed floor.

Figure 3:
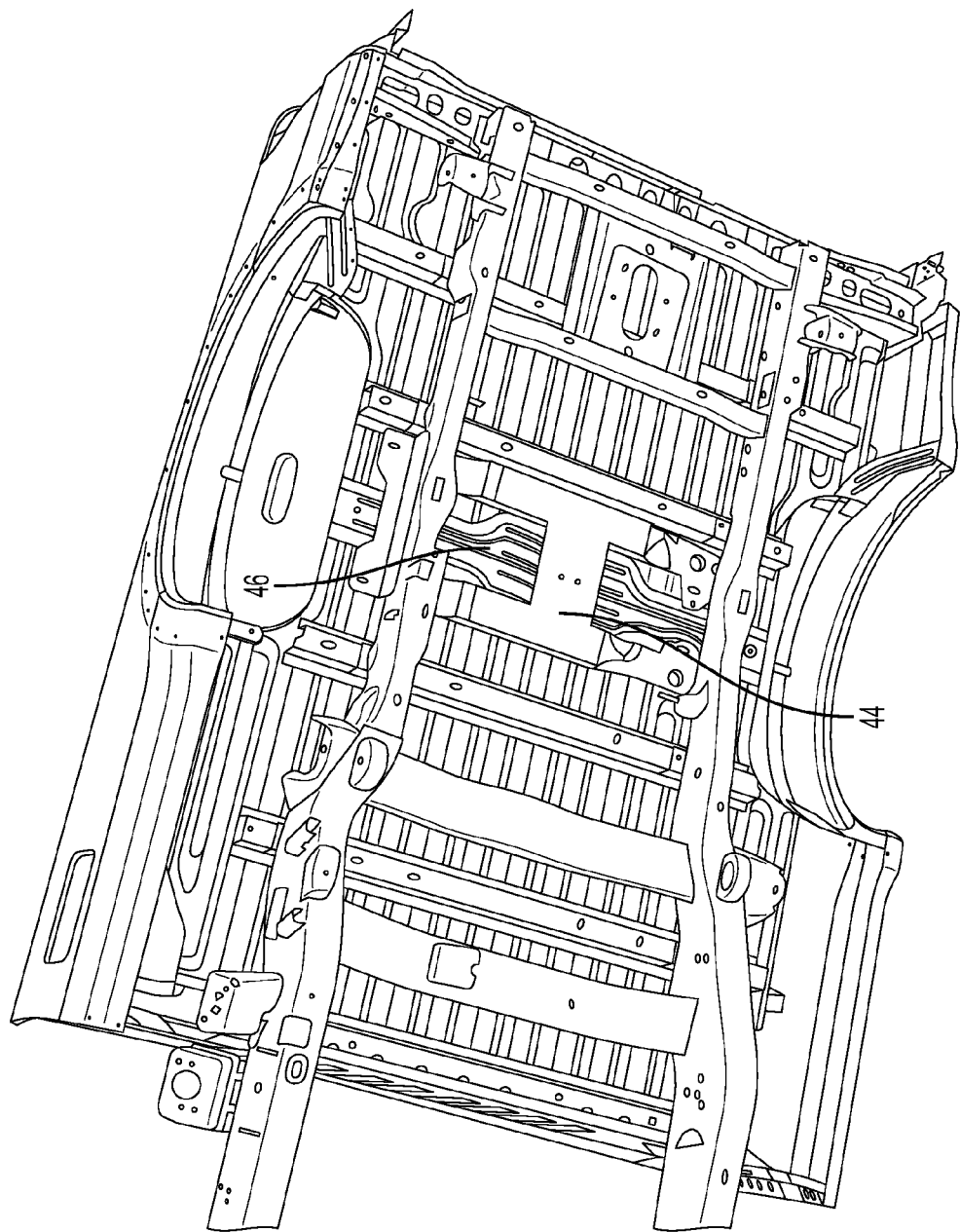
FIG. 3 is a bottom perspective view of the pickup bed and frame rails of FIG. 1 with provisions for mounting a trailer hitch.

FIG. 3 shows the frame of FIG. 1 adapted for installation of a gooseneck or fifth wheel hitch by inclusion of a hitch frame 44 extending between left and right frame rails close to the longitudinal location at which the rear axle is to be attached. Hitch frame 44 is rigidly fixed to the frame rails by welding, bolts, or other suitable fasteners. Hitch frame 44 may be installed at the time the truck is assembled. A center cross support 46 is welded to the bed floor 26 between the front cross members 36 and the rear cross members 38.

Figure 4:
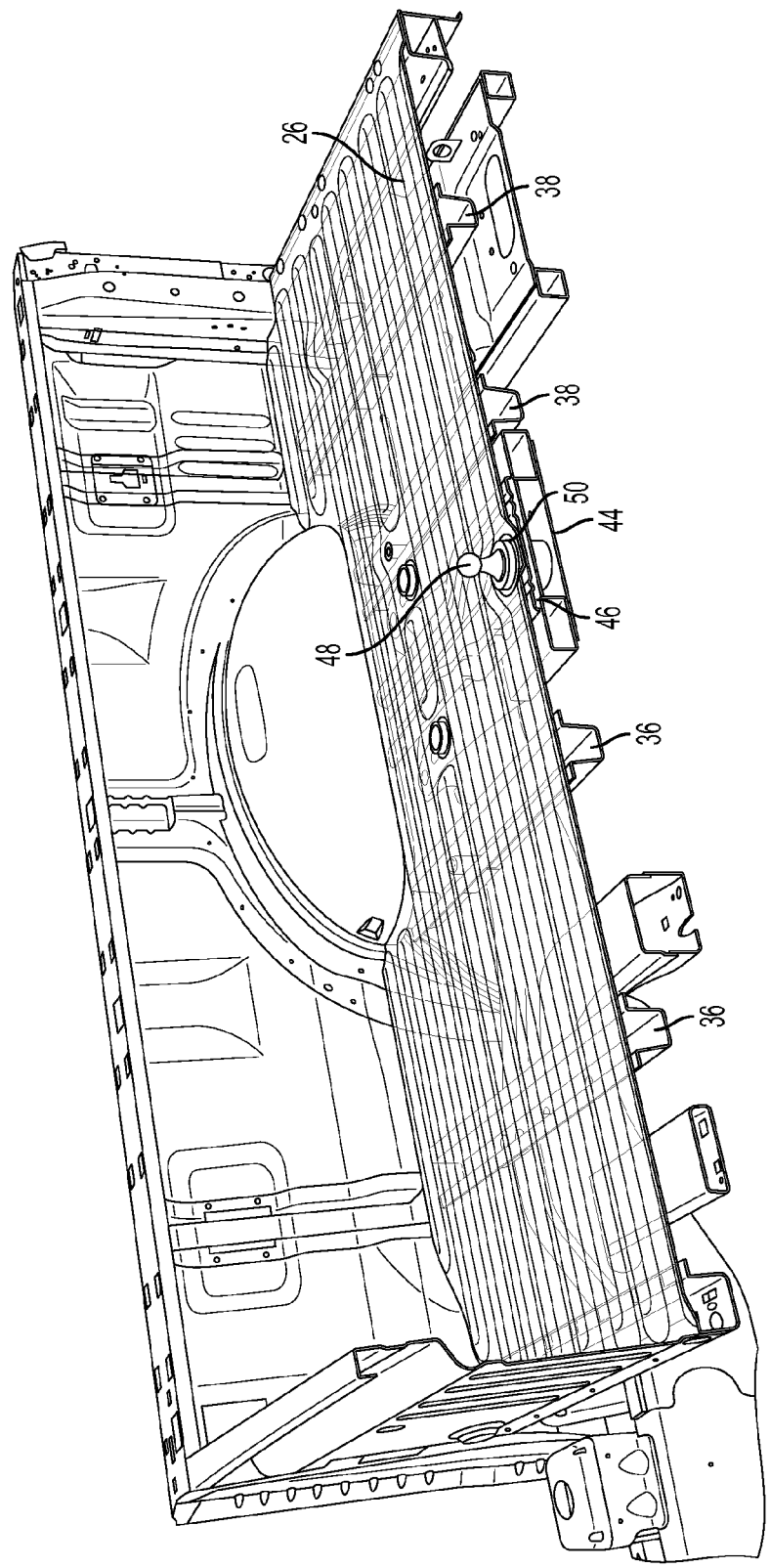
FIG. 4 is a cut-away perspective view of the pickup bed of FIG. 3 with a gooseneck hitch installed.
Figure 5:
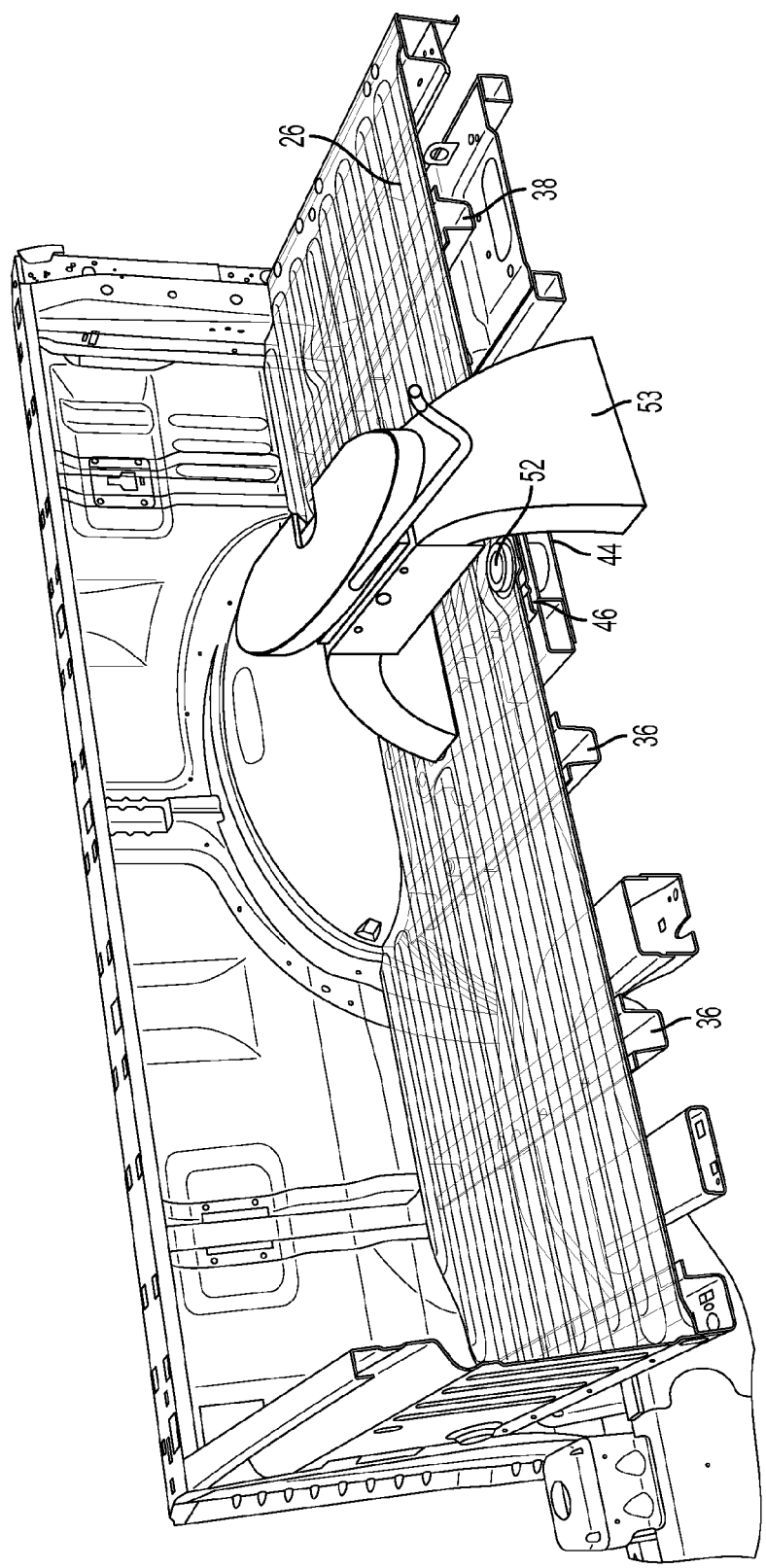
FIG. 5 is a cut-away perspective view of the pickup bed of FIG. 3 with a fifth wheel hitch installed.

FIG. 4 shows a cut-away section of the pickup frame and bed. In FIG. 4, a gooseneck hitch ball 48 installed into hitch frame 44 through hole 50 in bed floor 26. The thickness of center cross support 46 is restricted by the need to locate hitch frame 44 in close proximity to the bed floor 26. When hitch ball 48 is not installed, a cover 52 may be installed, as shown in FIG. 5, to prevent leakage through hole 50. Cover 52 may be installed when no hitch is installed or when fifth wheel hitch 53 is installed.

Figure 6:
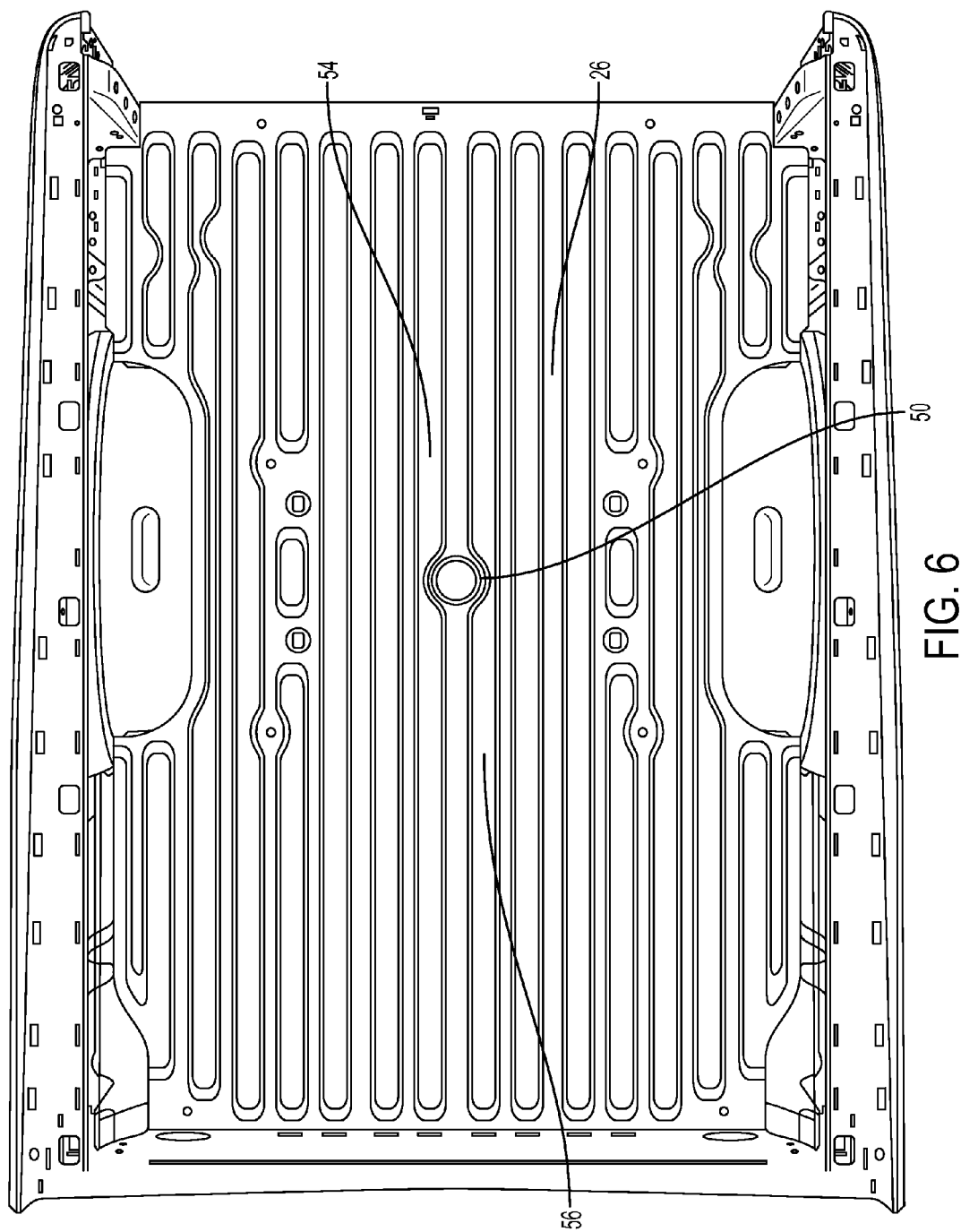
FIG. 6 is a top plan view of the floorpan of the pickup bed of FIG. 3.
Figure 7:
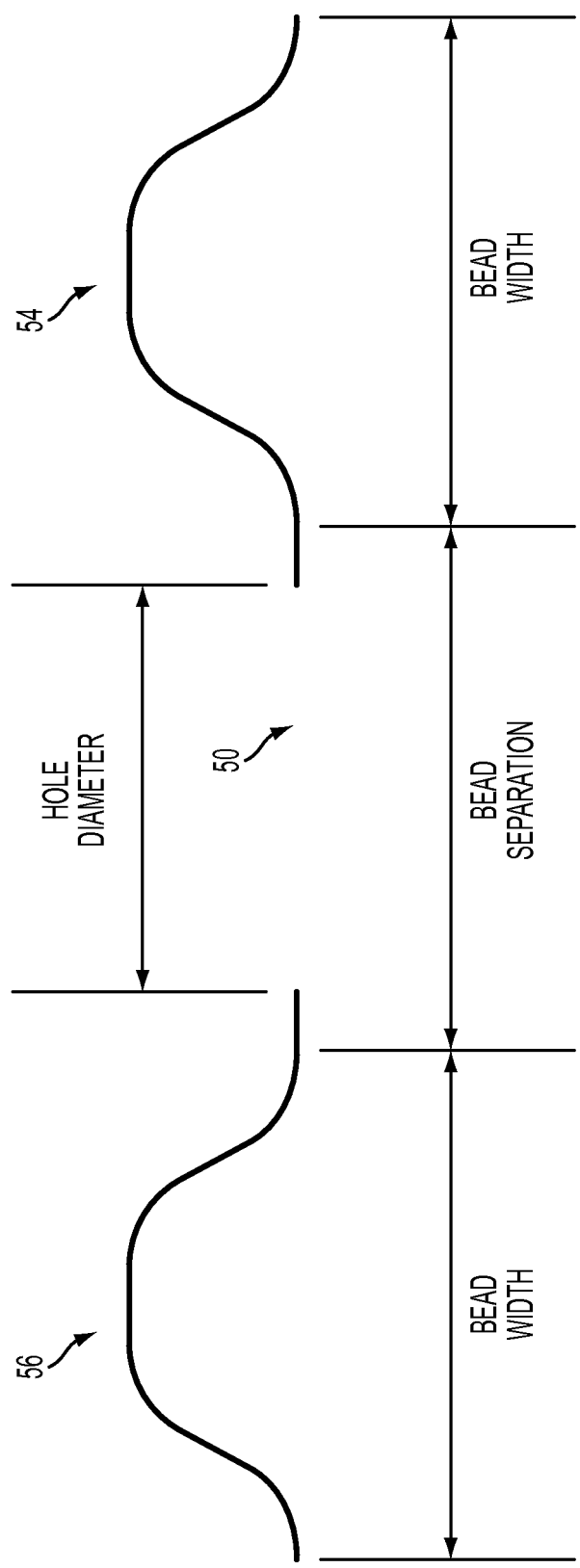
FIG. 7 is a diagrammatic partial cross section of the floorpan of the pickup bed of FIG. 3.

As shown in FIG. 6, the bead pattern is designed to avoid excessive localized deflection near hole 50. The center cross support 46 provides additional stiffness, but its limited thickness in this region limits its rigidity with respect to longitudinal bending loads. Center beads 54 and 56 run longitudinally on the right hand and left hand sides of hole 50, respectively. Beads 54 and 56 are separated, for most of their length, by a separation distance less than the diameter of hole 50. Beads 54 and 56 are narrowed near hole 50 to define a roughly circular flat area to accommodate hole 50. Although narrowed, beads 46 and 48 are not interrupted between the front and rear cross members and provide rigidity to resist longitudinal bending loads. FIG. 7 shows a cross section through the floor 26 at a station running through the center of hole 50.

While exemplary embodiments are described above, it is not intended that these embodiments describe all possible forms encompassed by the claims. The words used in the specification are words of description rather than limitation. It is understood that various changes can be made and the features of various embodiments can be combined to form further embodiments of the invention that may not be explicitly described or illustrated. While various embodiments are described as providing advantages or being preferred over other embodiments or prior art implementations, those of ordinary skill in the art should recognize that one or more features or characteristics can be compromised to achieve desired overall system attributes that depend on the specific application and implementation. Embodiments described as less desirable than other embodiments or prior art implementations with respect to one or more characteristics are not outside the scope of the disclosure and can be desirable for particular applications.

What is claimed is:

1. A pickup bed comprising:
   a sheet metal bed floor having two center beads extending from a front cross support to a rear cross support, the floor defining a hole between the center beads and between the front and rear cross supports, the center beads separated from one another by less than a diameter of the hole at the cross supports and by more than the diameter adjacent to the hole.

2. The pickup bed of claim 1 wherein the center beads have a first bead width at the front cross support and a second bead width less than the first bead width adjacent to the hole.

3. The pickup bed of claim 2 wherein the center beads have a bead width equal to the first bead width at the rear cross support.

4. The pickup bed of claim 1 further comprising:
   a center cross support welded to the sheet metal bed floor, the hole extending through the center cross support.

5. The pickup bed of claim 1 further comprising a cover inserted into the hole.

6. The pickup bed of claim 1 adapted for fixation to a pickup frame such that the hole is adjacent to a gooseneck hitch receiver in the pickup frame.

7. The truck of claim 1 wherein the sheet metal bed floor is made of an aluminum alloy.

8. The truck of claim 7 wherein the aluminum alloy is a 6xxx series alloy.

* * * * *